(12) United States Patent
Itoh et al.

(10) Patent No.: US 7,231,284 B2
(45) Date of Patent: Jun. 12, 2007

(54) CONTROLLER FOR HYBRID VEHICLE

(75) Inventors: Yoshiki Itoh, Shizuoka-ken (JP);
Tatsuji Mori, Shizuoka-ken (JP);
Norihiro Noda, Shizuoka-ken (JP)

(73) Assignee: Suzuki Motor Corporation,
Hamamatsu-Shi, Shizuoka-Ken (JP)

( * ) Notice: Subject to any disclaimer, the term of this patent is extended or adjusted under 35 U.S.C. 154(b) by 335 days.

(21) Appl. No.: 10/760,839

(22) Filed: Jan. 20, 2004

(65) Prior Publication Data
US 2004/0148071 A1  Jul. 29, 2004

(30) Foreign Application Priority Data
Jan. 21, 2003  (JP) .............................. 2003-012129

(51) Int. Cl.
*B60L 11/02* (2006.01)
(52) U.S. Cl. ........................ 701/22; 903/906; 903/942; 123/350; 477/3
(58) Field of Classification Search ................ 477/109, 477/3; 701/22; 903/908, 922, 940, 942, 903/917, 945, 906; 193/3.31, 103 C, 3.28; 180/65.2; 123/350; *B60L 7/14; B60K 6/00, B60K 8/00*
See application file for complete search history.

(56) References Cited

U.S. PATENT DOCUMENTS

| | | | | |
|---|---|---|---|---|
| 3,756,204 A | * | 9/1973 | Suda ........................... | 123/485 |
| 3,893,434 A | * | 7/1975 | Thatcher et al. ............ | 123/478 |
| 4,021,677 A | * | 5/1977 | Rosen et al. ............... | 290/40 R |
| 4,730,709 A | * | 3/1988 | Kawata et al. ............. | 192/3.31 |
| 5,348,127 A | * | 9/1994 | Murata et al. ............... | 192/3.3 |
| 5,670,830 A | * | 9/1997 | Koga et al. ................. | 307/10.1 |
| 5,856,709 A | * | 1/1999 | Ibaraki et al. ............... | 290/45 |
| 5,949,146 A | * | 9/1999 | VandenBerghe .......... | 290/40 R |
| 5,982,045 A | * | 11/1999 | Tabata et al. ................. | 290/17 |
| 5,984,034 A | * | 11/1999 | Morisawa et al. ......... | 180/65.2 |
| 6,199,650 B1 | * | 3/2001 | Masberg et al. ............ | 180/197 |
| 6,209,672 B1 | * | 4/2001 | Severinsky ................. | 180/65.2 |
| 6,364,807 B1 | * | 4/2002 | Koneda et al. ................ | 477/5 |
| 6,543,565 B1 | * | 4/2003 | Phillips et al. .............. | 180/165 |
| 6,616,569 B2 | * | 9/2003 | Hoang et al. .................. | 477/3 |

(Continued)

FOREIGN PATENT DOCUMENTS

| | | | |
|---|---|---|---|
| GB | 2084673 | * | 9/1981 |
| JP | 08-317506 | | 11/1996 |
| JP | 2000134713 A2 | * | 5/2000 |
| JP | 3350465 | | 11/2002 |

*Primary Examiner*—Cuong Nguyen
(74) *Attorney, Agent, or Firm*—Flynn, Thiel, Boutell & Tanis, P.C.

(57) ABSTRACT

In a controller unit for a hybrid vehicle, a generation controller controls the quantity of electric power generated by a motor generator, and a fuel cut controller stops fuel supply to the engine if a predetermined fuel cut condition is satisfied. The generation controller controls so that the quantity of electric power generated is set at predetermined values according to the engine speed, and is set at different values, at the same engine speed, according to whether the fuel cut occurs or not. Thus, the quantity of power generation does not decrease more than needed to prevent engine stall. When the fuel cut is not performed, the generation controller in particular increases the quantity of power generation, which charges the battery more and reduces fuel consumption.

6 Claims, 4 Drawing Sheets

U.S. PATENT DOCUMENTS

| | | | |
|---|---|---|---|
| 6,726,593 B2 * | 4/2004 | Yamamoto et al. | 477/5 |
| 2002/0058564 A1 * | 5/2002 | Yamamoto et al. | 477/3 |
| 2002/0058565 A1 * | 5/2002 | Yamamoto et al. | 477/5 |
| 2002/0134596 A1 * | 9/2002 | Morimoto et al. | 180/65.2 |
| 2002/0179047 A1 * | 12/2002 | Hoang et al. | 123/350 |
| 2003/0109357 A1 * | 6/2003 | Tabata | 477/109 |

* cited by examiner

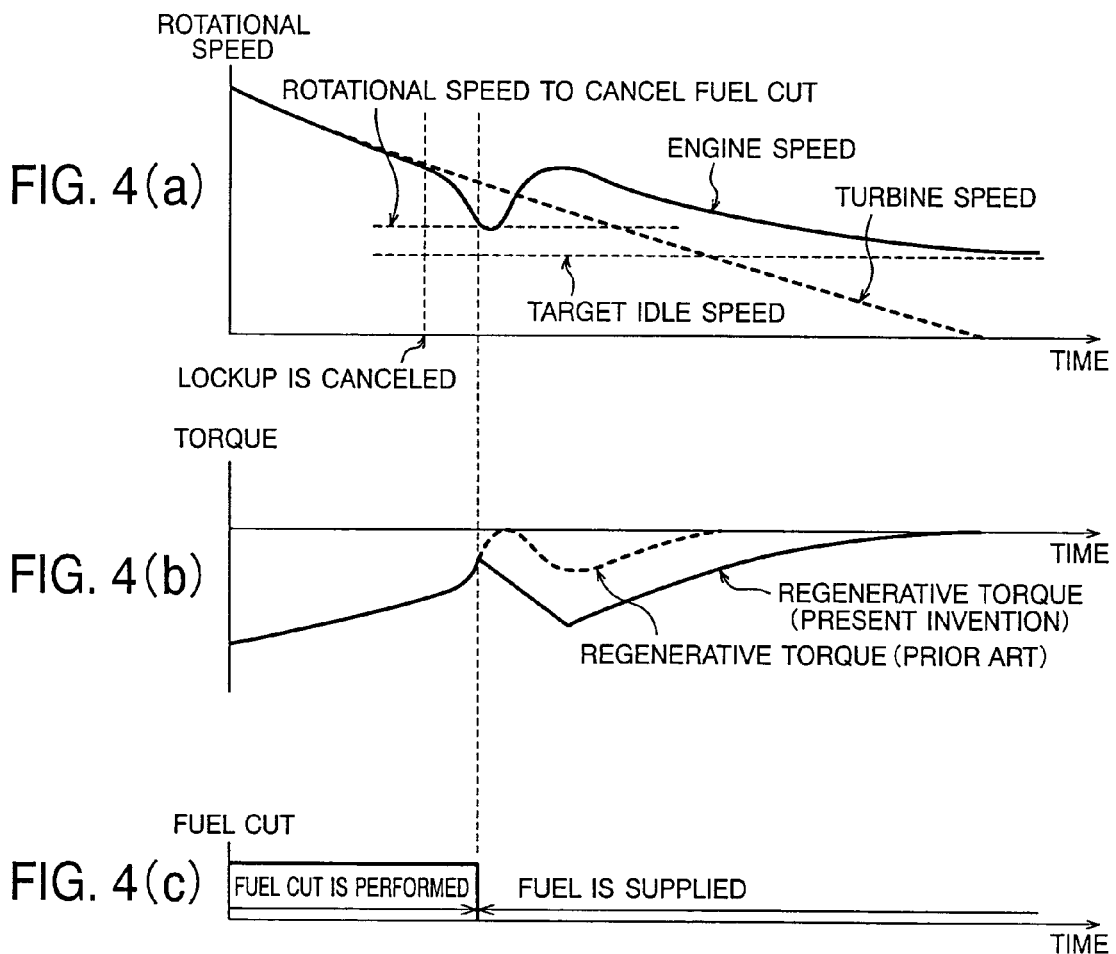
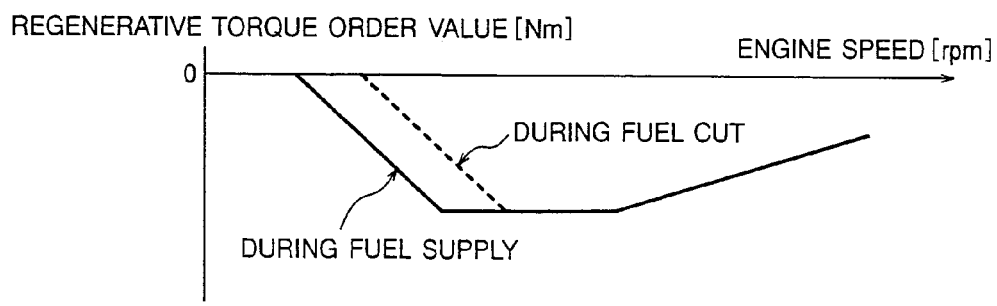
FIG. 5

CONTROLLER FOR HYBRID VEHICLE

CROSS-REFERENCE TO RELATED APPLICATIONS

This application is related to the following co-pending applications: (1) Ser. No. 10/760,837, filed concurrently herewith, and titled "ELECTRIC POWER REGENERATION CONTROLLER FOR HYBRID VEHICLE"; (2) Ser. No. 10/760,837, filed concurrently herewith, and titled "ELECTRIC POWER REGENERATION CONTROLLER FOR HYBRID VEHICLE"; and Ser. No. 10/760,838, filed concurrently herewith, and titled "CONTROLLER FOR HYBRID VEHICLE", the entire disclosures of which are herein incorporated by reference.

FIELD OF THE INVENTION

This Invention relates to a controller for a hybrid vehicle in which a motor is connected to a crankshaft of an engine and operates as a generator so as to generate electric power during deceleration of the vehicle, and more particularly to a controller for a hybrid vehicle to control the regenerative torque in a system combined with an automatic transmission and a lockup torque converter.

BACKGROUND OF THE INVENTION

In vehicles, there is a hybrid vehicle equipped with an internal combustion engine and a motor generator as a drive source. In this hybrid vehicle, the engine is directly connected to the motor generator that performs the function of driving and assisting the engine. The states of the driving and assisting by the motor are controlled according to the driving states of the hybrid vehicle and the engine. Also, in a conventional controller for the hybrid vehicle, the hybrid vehicle is equipped with a motor generator (referred to as "motor") as well as the engine to improve fuel economy. This type of arrangement is disclosed in JP Patent Number 3350465 and JP Application Laid-Open No. H08-317506.

Conventionally, the quantity of electric power generated by the motor is determined based on the engine speed, i.e., the quantity of generated electric power decreases with decreasing engine speed and is set to become zero when the engine speed is below a speed for canceling fuel cut (return speed).

In this system, the regenerative braking torque does not interfere with the engine torque when a fuel supply controller restarts fuel supply. Accordingly, engine stall is prevented to eliminate a driver's worry that engine stop will occur in opposition to the driver's intent. Therefore comfortable driving of the vehicle is maintained.

Also, in this system, the quantity of electric power generation gradually decreases to zero in accordance with the engine speed decreasing from a certain threshold speed to a return speed. This avoids an unexpected shock to a passenger or operator which may result from sudden prevention of generation during deceleration when the fuel supply controller restarts fuel supply. Thus, comfortable driving of the vehicle can be achieved.

However, the quantity of power generation is based on the engine speed even after the fuel cut is cancelled, and the power generation is therefore reduced to and maintained in a quantity or amount that prevents engine stall. After the fuel cut is canceled, the power generation decreases more than needed, and power generation that should ordinarily be collected is not collected.

In particular, for a vehicle provided with an automatic transmission with a torque converter, the quantity of air for idle in a running range is set at more than that in a non-running range to increase the engine output torque so as to prevent engine stall due to an increase of creep torque load. During coasting, the engine speed is greater than needed in comparison with the engine speed at idling due to the force from the drive wheels. Thus fuel economy is decreased.

SUMMARY OF THE INVENTION

In order to obviate or minimize the above-mentioned situation, the present invention provides a controller for a hybrid vehicle having an internal combustion engine and a motor generator that drives and assists the engine. In this controller, a control unit includes a generation controller to control the quantity of the electric power generated by the motor generator, and a fuel cut controller to stop fuel supply if a predetermined fuel cut condition is satisfied. The generation controller of the control unit controls such that the quantity of electric power generation is set at predetermined values according to engine speed, and is set at different values, at the same engine speed, according to whether the fuel cut occurs or not. This generation of electric power to charge a battery typically occurs during deceleration of a vehicle by coasting or direct application of vehicle brakes.

BRIEF DESCRIPTION OF THE DRAWINGS

FIG. 4(*a*) is a time chart of the engine speed for use of the controller.

FIG. 4(*b*) is a time chart of the torque.

FIG. 4(*c*) is a time chart for fuel cut.

FIG. 5 is a table to calculate basic regenerative torque.

DETAILED DESCRIPTION

The present invention is described as follows in specific detail with reference to the Figures.

Figure 1:
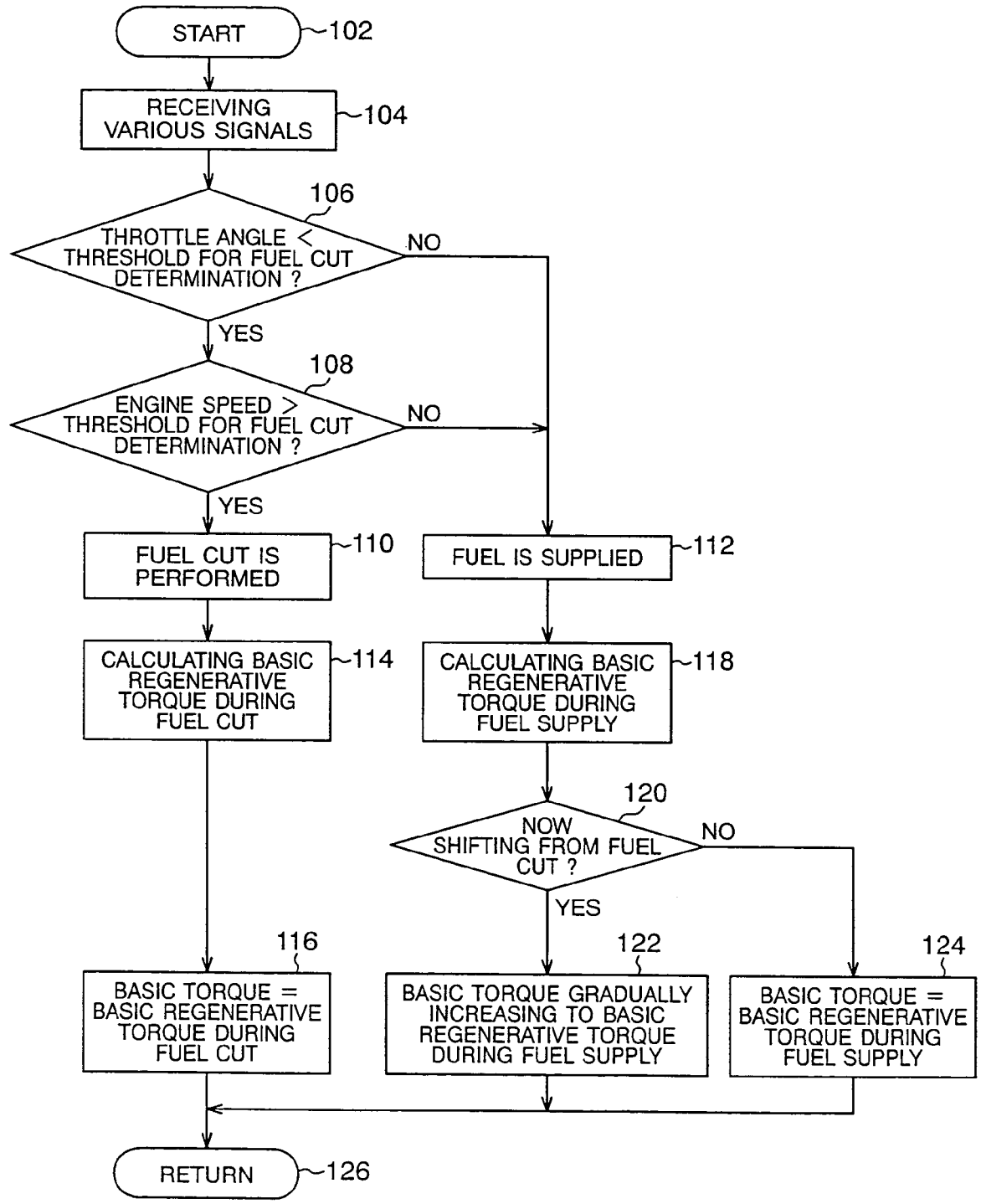
FIG. 1 is a flowchart for control of a hybrid vehicle according to an embodiment of the present invention.
Figure 2:
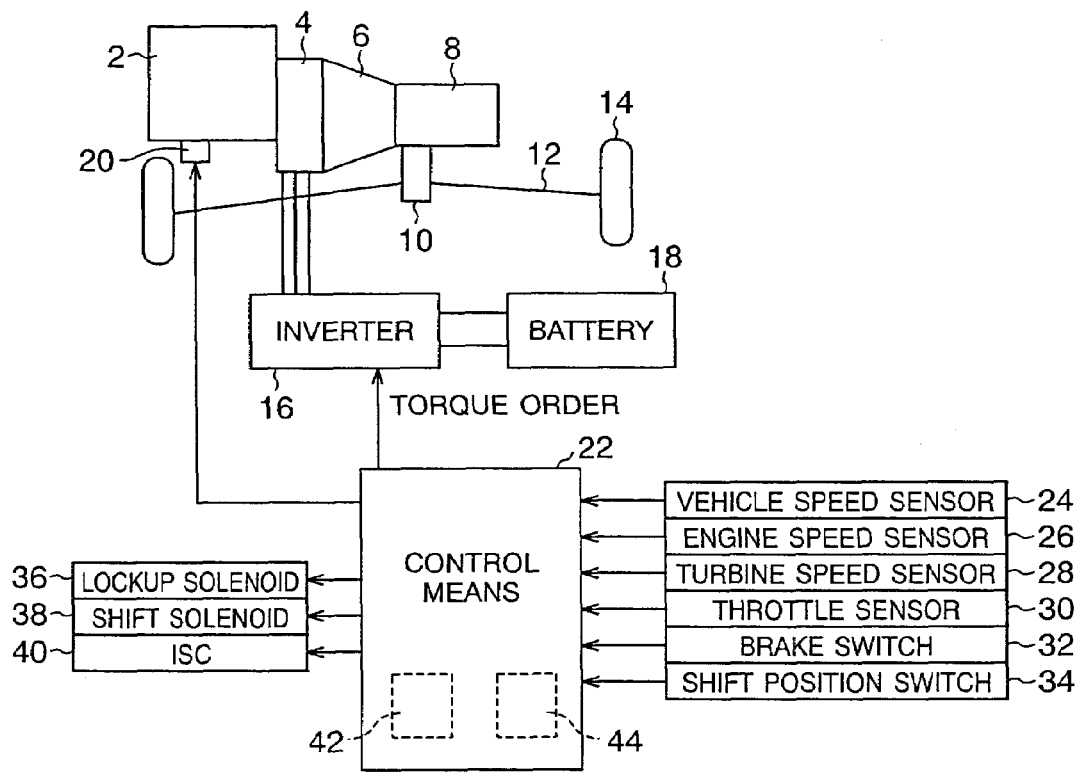
FIG. 2 is a schematic diagram showing a system with the controller for the hybrid vehicle.

FIGS. 1–6 illustrate an embodiment of the present invention. FIG. 2 shows an internal combustion engine 2 mounted on, e.g., a hybrid vehicle (not shown).

In this hybrid vehicle (not shown), a motor generator (also simply referred to as "motor") 4 is directly connected to the engine 2 and to an automatic transmission 8 equipped with a torque converter 6 having a lockup mechanism (not shown). This lockup mechanism has a slip range and a lockup range, as indicated by lockup lines defined by the vehicle speed and the throttle opening angle in FIG. 6.

The motor generator 4 functions as a motor which is capable of driving and assisting the engine 2 in driving, and as a generator for charging a battery 18.

The automatic transmission 8 is a transmission that can change speeds by hydraulic oil control. Also, the automatic transmission 8 is provided with a differential 10 in connection with drive wheels 14 through drive shafts 12.

The motor generator 4 is connected to the battery 18 through an inventor 16. The engine 2 is equipped with a fuel injector 20 that includes a fuel injection valve. The fuel injector 20 and the inverter 16 are connected to a control unit 22. The control unit 22 is connected to, on an input side thereof, a vehicle speed sensor 24 to detect the vehicle speed, an engine speed sensor 26 to detect the rotational speed of the engine, a turbine rotational speed sensor 28 to detect the rotational speed of a turbine (not shown) in the torque converter 6, a throttle sensor 30 to detect throttle angle, a brake switch 32 to detect a state in which a brake pedal (not shown) is depressed, and a shift lever position switch 34 to detect a location of a shift lever (not shown).

Further, the control unit 22 is connected, on an output side thereof, to a lockup solenoid (also referred to as "lockup SOL") 36 that forms a part of the lockup mechanism, a shift solenoid (also referred to as "shift SOL") 38, and an ISC valve (idle speed control valve) 40.

The control unit 22 includes a power generation controller 42 and a fuel cut controller 44. More particularly, the generation controller 42 controls the quantity of the electric power generated by the motor generator 4. The fuel cut controller 44 stops fuel supply if a predetermined fuel cut performance condition is satisfied. The generation controller 42 of the control unit 22 controls such that the quantity of electric power generation is set at predetermined values based on the engine speed, and is set at different values, at the same engine speed, according to whether the fuel cut occurs or not.

More in detail, the quantity of the electric power generated by the motor generator 4 while the fuel cut is not performed by the fuel cut controller 44, is greater than that generated while the fuel cut is performed.

Moreover, when the fuel cut controller 44 shifts or returns from the fuel cut (i.e., when canceling the fuel cut), the quantity of the power generation is set to increase gradually to be of a value that corresponds to the value when the fuel cut is not performed.

Further, the quantity of the power generated by the motor generator 4 is set to decrease with decrease of the engine speed, and to be zero when the engine speed is substantially at target idle speed where the fuel cut is not performed.

In other words, the quantity of electric power generated by the motor generator 4 is set to decrease in accordance with decrease of the engine speed. The generation controller 42 permits the quantity of the power generation to differ according to whether or not the fuel cut is performed by the fuel cut controller 44. If the fuel cut is not performed, the quantity of power generation is greater than that while the fuel cut is performed at the same engine speed. Even after the fuel cut is canceled, the power is generated as much as possible to collect and store the electric power to thus improve fuel economy.

Moreover, in returning from the fuel cut by the fuel cut controller 44, the quantity of power generation is set to gradually increase until the quantity corresponds to the quantity when the fuel cut is not performed so as to avoid a sudden increase in the load of the power generation in a state where the engine torque is not recovered, thereby preventing engine stall.

Further, the quantity of power generation without the fuel cut is set to be zero when the engine speed is substantially at the target idle speed, so that the electric power is generated only when the engine speed is increased by the force transmitted from the drive wheels during coasting. As a result, the kinetic energy of the vehicle is effectively utilized to generate the electric power. Also, negative influence on a learning control of the idle speed is prevented.

This prevention of negative influence on the learning control of the idle speed results in the idle speed learning control being affected if the quantity of electric generation is not zero within the target idle speed range. In other words, an area for power generation is extended which is greater than that of the prior art, but in the target idle speed range, the quantity of power generation must be zero.

Figure 3:
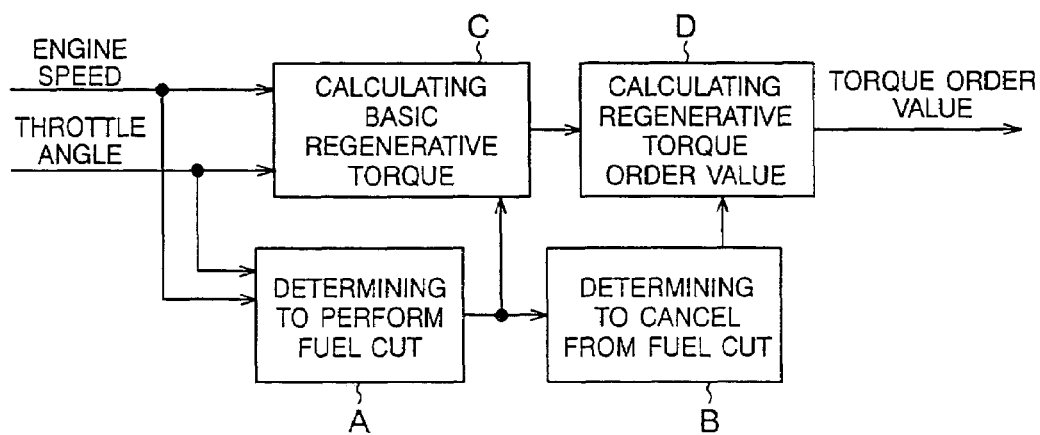
FIG. 3 is a block diagram for a controller.
Figure 6:
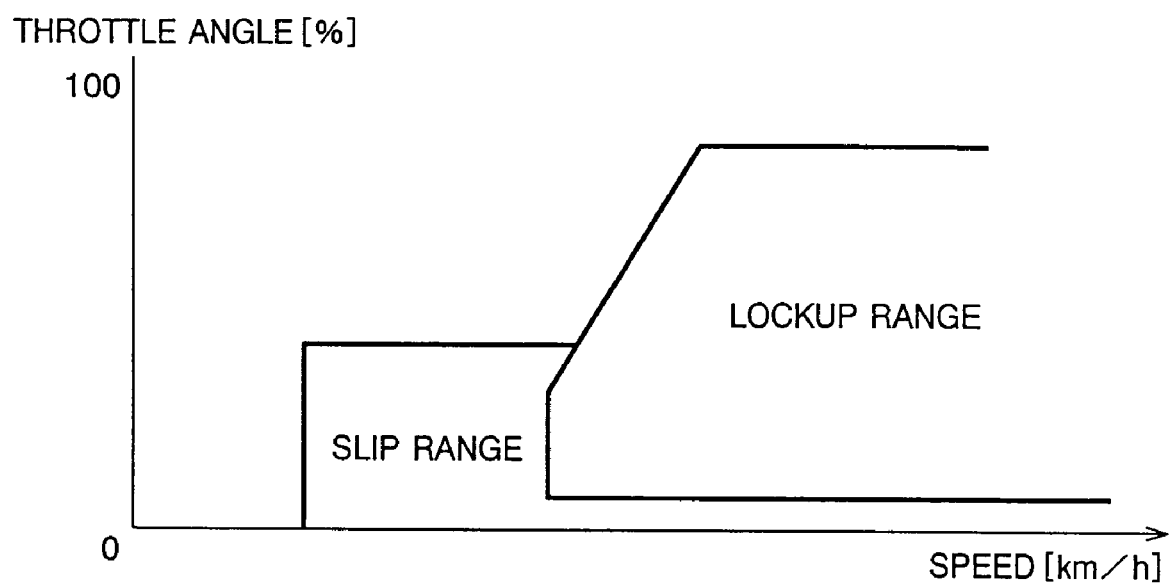
FIG. 6 is a diagram with regard to lockup.

Operation of the control unit 22 is described as follows with reference to FIG. 3.

A fuel cut determining process A determines whether the fuel cut should occur based on the engine speed output from the engine speed sensor 26 and the throttle angle output from the throttle sensor 30 on the input side of the torque converter 6, followed by a fuel cut cancel determining process B. A basic regenerative torque calculating process C calculates basic regenerative torque with reference to a table shown in FIG. 5.

After processes B and C, a regenerative torque calculating process D calculates a torque order value that is sent to the inverter 16.

Next, operation of the controller for the hybrid vehicle is explained as follows with reference to a flowchart in FIG. 1.

A control program for the controller for the hybrid vehicle starts at step 102. Then the controller receives signals from various sensors 24, 26, 28, 30 and switches 32, 34 at step 104.

A determination is made at a step 106 whether the throttle opening angle detected by the throttle sensor 30 is below a threshold angle for fuel cut determination. If the determination at step 106 is "YES", then another determination is made at step 108 as to whether the engine speed received from the engine speed sensor 26 exceeds a threshold speed for fuel cut determination. If the determination at step 108 is "YES", then fuel cut controller 44 performs the fuel cut at step 110.

If one of the determinations at steps 106 and 18 is "NO", then the fuel is supplied at step 112.

After the fuel cut occurs at step 110, the basic regenerative torque during fuel cut is calculated at step 114 with reference to the table for calculating the basic regenerative torque in FIG. 5. The regenerative torque is set at the calculated basic regenerative torque during fuel cut at step 116, and then the program returns at step 126.

After the fuel supply begins at step 112, the basic regenerative torque during fuel supply is calculated at step 118 with reference to the table for calculating the basic regenerative torque in FIG. 5. A determination is made at step 120 whether the fuel cut is now canceling.

If the determination at step 120 is "YES", the regenerative torque is set to increase gradually to the basic regenerative torque during fuel supply at step 122, and the program returns at step 126. If the determination at step 120 is "NO", the regenerative torque is set at the basic regenerative torque during fuel supply at step 124, and the program returns at step 126.

As a result, the characteristic of the quantity of the power generation with respect to the engine speed is separated according to whether or not the fuel cut controller 44 performs the fuel cut. The quantity of power generation does not decrease more than needed to prevent the engine stall. When the fuel cut is not performed, the power generation controller 42 in particular increases the quantity of power generation, which charges the battery more and reduces fuel consumption.

In addition, the quantity of the electric power generated by the motor generator 4 while the fuel cut is not performed by the fuel cut controller 44, is more than that while the fuel cut is performed. Accordingly, the quantity of the electric power generated is increased in particular, when the fuel cut does not occur, which reduces fuel consumption and is advantageous from an economical viewpoint.

Further, when returning from the fuel cut to cancel the fuel cut, the quantity of the power generation is set to gradually increase to the quantity when the fuel cut is not performed to prevent engine stall, which is advantageous in practical use.

Still further, the quantity of electric power generated by the motor generator 4 is set to decrease with a decrease in the engine speed, and to be zero when the engine speed is substantially at the target idle speed while the fuel cut is not performed. Thereby, the electric power is generated until the engine speed decreases to near the target idle speed. The electric power is also generated when the engine speed is increased by the force from the drive wheels during coasting. As a result, the kinetic energy of the vehicle is effectively utilized to generate the electric power.

The present invention is not limited to the above-mentioned embodiment, but is adaptable for various applications and variations or modifications.

What is claimed:

1. A controller for hybrid vehicle having an internal combustion engine operating from a fuel supply and a motor generator that drives and assists said engine, said controller comprising a control unit that includes an electric power generation controller to control the quantity of electric power generated by said motor generator during variations in engine speed, and a fuel cut controller to stop fuel supply if a predetermined fuel cut condition is satisfied, said power generation controller of said control unit controlling such that the quantity of electric power generation is set at predetermined values according to engine speed, and is set at different values, at the same engine speed, according to whether the fuel cut is performed or is not performed, wherein the quantity of the electric power generation while the fuel cut is not performed is greater than the quantity of the electric power generation while the fuel cut is performed at the same engine speed, said power generation controller controlling the quantity of electric power generation so as to be at the greater quantity, which corresponds to when the fuel cut is not performed, after the fuel cut control has been performed and when the throttle opening angle is less than a threshold angle for fuel cut.

2. The controller for the hybrid vehicle as defined in claim 1, wherein when the fuel cut is canceling, the quantity of electric power generation is gradually increased so the quantity corresponds to a quantity when the fuel cut is not performed.

3. The controller for the hybrid vehicle as defined in claim 1, wherein the quantity of the power generation while the fuel cut is performed and the quantity while the fuel cut is not performed are set to decrease with decrease of the engine speed, and the quantity of the power generation is set to be zero when the engine speed is substantially at target idle speed and the fuel cut is not performed.

4. A method for controlling fuel supply for a hybrid vehicle having an internal combustion engine and a motor generator that drives and assists said engine, said method comprising:

performing a fuel cut by cutting fuel supply to the engine when (1) a sensed throttle angle value is less than a threshold angle value, and (2) engine speed is greater than a predetermined engine speed value;

when a fuel cut is not performed, controlling by control means a quantity of electric power generated by said motor generator at first predetermined values corresponding to engine speed; and when a fuel cut is performed, controlling by said control means the quantity of electric power generated by said motor generator at second predetermined values corresponding to engine speed, the second predetermined values being different than the first predetermined values at the same engine speed wherein the first predetermined values are greater than the second predetermined values at the same engine speed, and the control means uses the first predetermined values after using the second predetermined values during deceleration of the vehicle.

5. The method according to claim 4, wherein the quantity of the power generated while the fuel cut is performed and the quantity while the fuel cut is not performed decreases with decrease in the engine speed and the power generated by the motor generator is zero when the engine speed is substantially at target idle speed and the fuel cut is not performed.

6. The method according to claim 4, including the step of gradually increasing the quantity of electric power generated when the fuel cut is canceling so that the quantity of electric power generated when the fuel cut finishes corresponds to the quantity of electric power generated when the fuel cut is not performed for a given engine speed.

* * * * *